(12) United States Patent
Chalmers et al.

(10) Patent No.: US 9,478,965 B2
(45) Date of Patent: Oct. 25, 2016

(54) CRYOGENIC ELECTRICAL FEED-THROUGH

(71) Applicant: ACD, LLC, Santa Ana, CA (US)

(72) Inventors: Dennis W. Chalmers, Lake Forest, CA (US); Mark Geipel, Laguna Niguel, CA (US); Rahul Joshi, Costa Mesa, CA (US)

(73) Assignee: ACD, LLC, Santa Ana, CA (US)

( * ) Notice: Subject to any disclaimer, the term of this patent is extended or adjusted under 35 U.S.C. 154(b) by 10 days.

(21) Appl. No.: 14/690,250

(22) Filed: Apr. 17, 2015

(65) Prior Publication Data

US 2015/0305187 A1 Oct. 22, 2015

Related U.S. Application Data

(60) Provisional application No. 61/981,133, filed on Apr. 17, 2014.

(51) Int. Cl.
*H02G 15/34* (2006.01)
*H01R 4/68* (2006.01)

(52) U.S. Cl.
CPC ............... *H02G 15/34* (2013.01); *H01R 4/68* (2013.01)

(58) Field of Classification Search
USPC .................................................. 174/650, 659
See application file for complete search history.

(56) References Cited

U.S. PATENT DOCUMENTS

| 6,150,607 A * | 11/2000 | Weyl | H01B 17/308 16/2.1 |
| 6,777,616 B2 * | 8/2004 | Beele | H05K 9/0018 174/140 R |
| 7,939,769 B2 * | 5/2011 | Hudlet | H01R 13/5208 174/135 |

* cited by examiner

*Primary Examiner* — Dhirubhai R Patel
(74) *Attorney, Agent, or Firm* — Hackler Daghighian Martino & Novak

(57) ABSTRACT

A cryogenic electrical power feed-through assembly includes a contact header assembly. The contact header assembly includes a feed-through body forming a feed-through body cavity disposed therethrough extending between a first opening end to a second opening end. A first contactor plate assembly is disposed at and hermetically seals the first opening end of the feed-through body with a first electron beam weld formed between the first contactor plate and the first opening end. A second contactor plate assembly is disposed at and hermetically seals the second opening end of the feed-through body with a second electron beam weld formed between the second contactor plate and the second opening end. Each contactor plate assembly includes a contactor plate, a plurality of insulative bushings hermetically sealed to and extending through the contactor plate, and a plurality of contact pins hermetically sealed to and extending through the plurality of insulative bushings.

42 Claims, 11 Drawing Sheets

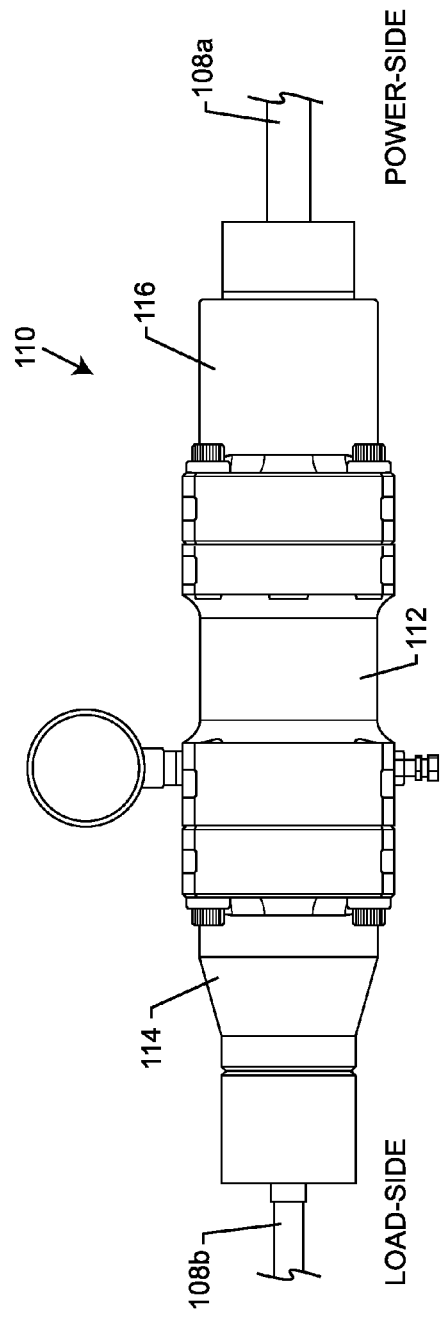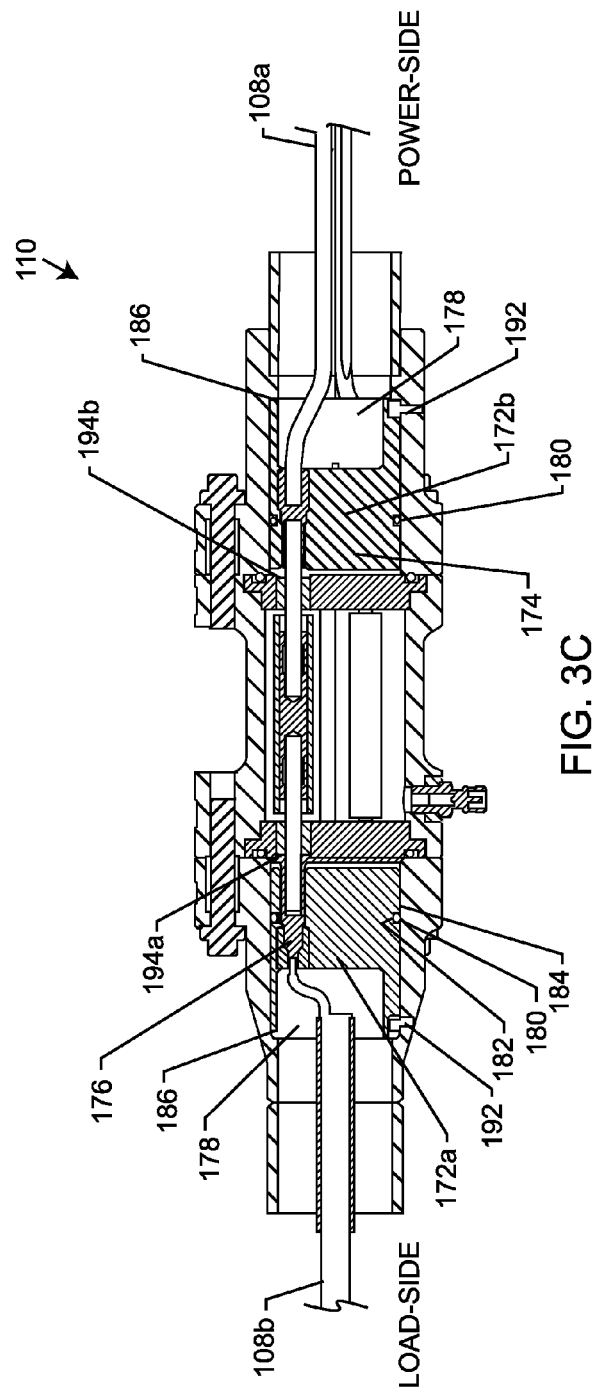

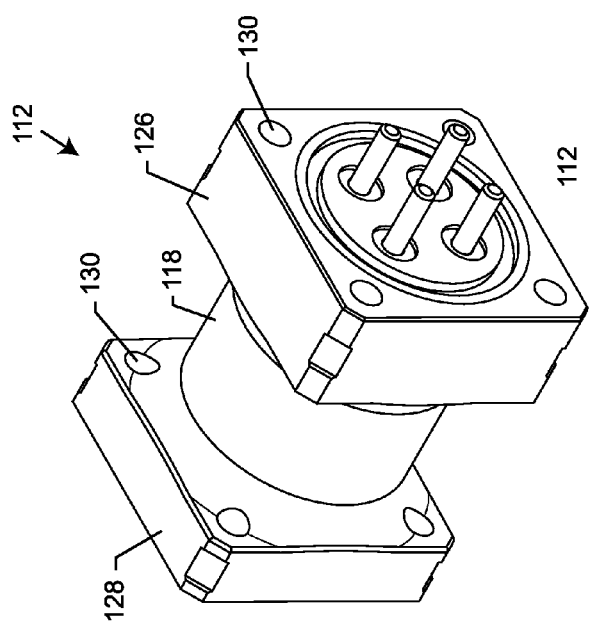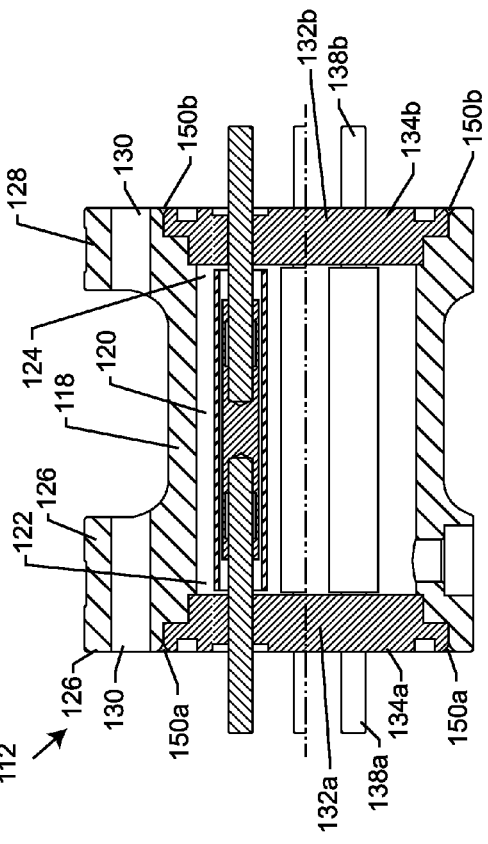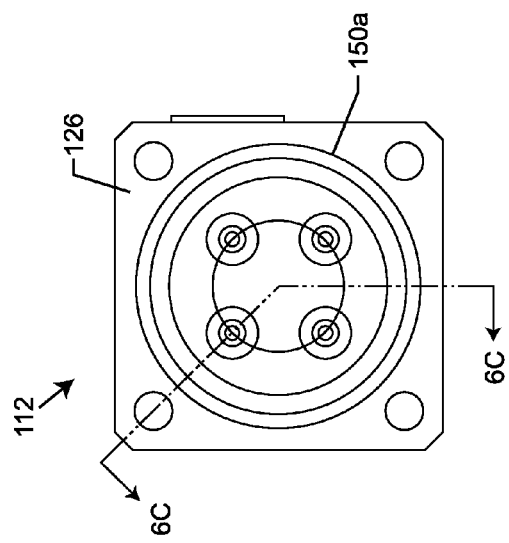

ns of the field of the invention

CRYOGENIC ELECTRICAL FEED-THROUGH

CROSS-REFERENCE TO RELATED APPLICATIONS

This non-provisional patent application claims priority to provisional application 61/981,133 filed on Apr. 17, 2014, the contents of which are fully incorporated herein with this reference.

FIELD OF THE INVENTION

The present invention generally relates to an electrical feed-through. More particularly, the present invention relates to a cryogenic process, dual-seal, low-voltage electrical power feed-through for submerged motors, generators pumps, turbines and mixers.

BACKGROUND OF THE INVENTION

FIG. 1 shows an exploded view of a prior art cryogenic electrical power feed-through assembly 10. The feed-through assembly 10 provides an electrical path for conducting electrical power through a pressure boundary of an LNG (Liquid Nitrogen Gas) or other cryogenic fluids process or storage systems. A centrally located contact header assembly 12 has two main seals 14 that are compressed by a power-side flange 16 and a load-side flange 18. Each flange has conductive contact pins 20 sealed therein. The pins 20 are electrically connected inside the contact header assembly 12 such that power is transferred from the atmospheric side to the cryogenic side.

Many problems exist with this prior art design. First, the flanges 16 and 18 are of a standard size and shape. This is actually quite problematic as the proper orientation and assembly is not intuitive and fool-proof. It is very common for the flanges to be rotated incorrectly or to be attached incorrectly. In many shops and installation locations, similar flanges may be easily located on site. This allows an installer the availability of using non-compliant flange connection parts or to improperly assembly the components. Second, the prior art design is susceptible to leaks and breakdown of the hermetic seals. A more robust design is necessary. Third, the prior art designs are too large in size. This means they are overly heavy and hard to install. Fourth, there are no grounding lugs available on the prior art designs. Finally, there is no ingress protection for the connectors so possibility of sparking due to foreign material ingress exists despite proper electrical isolation.

Accordingly, there is a need for an improved cryogenic electrical power feed-through assembly. The present invention fulfills these needs and provides other related advantages.

SUMMARY OF THE INVENTION

An embodiment of a contact header assembly configured to be installed as part of a cryogenic electrical power feed-through assembly includes a feed-through body forming a feed-through body cavity disposed therethrough extending between a first opening end to a second opening end. A first contactor plate assembly includes a first contactor plate, a first plurality of insulative bushings hermetically sealed to and extending through the first contactor plate, and a first plurality of contact pins hermetically sealed to and extending through the first plurality of insulative bushings, wherein the first plurality of contact pins are electrically conductive and in non-conductive relation to the first contactor plate and feed-through body. A second contactor plate assembly includes a second contactor plate, a second plurality of insulative bushings hermetically sealed to and extending through the second contactor plate, a second plurality of contact pins hermetically sealed to and extending through the second plurality of insulative bushings, wherein the second plurality of contact pins are electrically conductive and in non-conductive relation to the second contactor plate. The first contactor plate assembly is disposed at and hermetically seals the first opening end of the feed-through body with a first electron beam weld formed between the first contactor plate and the first opening end. The second contactor plate assembly is disposed at and hermetically seals the second opening end of the feed-through body with a second electron beam weld formed between the second contactor plate and the second opening end.

In other alternative embodiments, the feed-through body may include an integrally formed first flange disposed at the first opening end, and the feed-through body may further include an integrally formed second flange disposed at the second opening end.

A first outwardly facing surface of the first contactor plate may include a first annular groove, the first annular groove encompassing the first plurality of insulative bushings and contact pins, and wherein a second outwardly facing surface of the second contactor plate may include a second annular groove, the second annular groove encompassing the second plurality of insulative bushings and contact pins.

The first and second flanges may each include a plurality of fastener holes, wherein the plurality of fastener holes each have a female-thread.

The first flange and second flange may each have an outer rectangular surface.

The contact header assembly may include a load-side body forming a first cavity disposed therethrough extending between a first fitting end to a load-side flanged end, wherein the load-side flanged end of the load-side body is connected to the first flange of the feed-through body, and including a first seal disposed within the first annular groove, the first seal compressed between the first contactor plate and the load-side flanged end.

The contact header assembly may include a power-side body forming a second cavity disposed therethrough extending between a second fitting end to a power-side flanged end, wherein the power-side flanged end of the power-side body is connected to the second flange of the feed-through body, and including a second seal disposed within the second annular groove, the second seal compressed between the second contactor plate and the power-side flanged end.

The first fitting end or the second fitting end may be a weldneck fitting, a socket weld fitting or a female pipe fitting.

The load-side flanged end may include a load-side plurality of fastener holes aligned to the plurality of fastener holes of the first flange of the feed-through body, and wherein the power-side flanged end has a power-side plurality of fastener holes aligned to the plurality of fastener holes of the second flange of the feed-through body. The load-side plurality of fastener holes and the power-side plurality of fastener holes may each have a female threaded portion adjacent to a female unthreaded portion.

A load-side connector base may have at one end a first plurality of conductive pin receptacles configured to receive a portion of each of the first plurality of contact pins, where the first plurality of conductive pin receptacles are connectable to a load side conductor at the other end.

A power-side connector base may have at one end a second plurality of conductive pin receptacles configured to receive a portion of each of the second plurality of contact pins, where the second plurality of conductive pin receptacles are connectable to a power side conductor at the other end.

A first circumferential vapor seal may be between an outside surface of the load-side connector base and an inside surface of the load-side body, and including a second circumferential vapor seal between an outside surface of the power-side connector base and an inside surface of the power-side body.

A first gasket may be between the load-side connector base and the first contactor plate, the first gasket comprising a plurality of holes configured to facilitate the first plurality of contact pins extending therethrough, wherein the first gasket is smaller in diameter in comparison to the first seal, and including a second gasket between the power-side connector base and the second contactor plate, the second gasket comprising a plurality of holes configured to facilitate the second plurality of contact pins extending therethrough, wherein the second gasket is smaller in diameter in comparison to the second seal.

The first and second plurality of contact pins may extend beyond both sides of their respective first and second contactor plates.

The first plurality of contact pins may be respectively aligned to the second plurality of contact pins.

The first plurality of contact pins may be electrically coupled to the second plurality of contact pins.

The contact header assembly may include a plurality of electrically conductive connectors, each connector having a first socket end opposite a second socket end, wherein the plurality of connectors electrically connect the plurality of first contact pins to the plurality of second contact pins.

The first plurality of contact pins may be partially disposed respectively within the first socket ends and the second plurality of contact pins are partially disposed respectively within the second socket ends.

The contact header assembly may include a plurality of insulative sleeves disposed around the plurality of connectors.

The first and second flange may each have at least one anti-rotation pin feature, where the anti-rotation pin feature is non-symmetrically aligned with respect to the plurality of fastener holes.

The contact header assembly may include a pressure valve disposed within the feed-through body in pressurized communication with the feed-through body cavity.

The first plurality of insulative bushings may be glass bushings.

The first flange, second flange, load-side flanged end and power-side flanged end may each have an outer rectangular surface.

At least one side of each outer rectangular surface may include a repeated indicia that is aligned along a length of the cryogenic electrical power feed-through assembly.

The contact header assembly of claim 7, wherein the first flange, second flange, load-side flanged end and power-side flanged end each have a non-standard ANSI-type flange.

A plurality of fasteners may fasten the first flange to the load-side flanged end and fasten the second flange to the power-side flanged end, wherein the plurality of fasteners may be captive fasteners, the captive fasteners captured with respect to the load-side and power-side flanged ends.

The first plurality of conductive pin receptacles may be epoxied within the load-side connector base, the first plurality of conductive pin receptacles in non-conductive relation to one another and to the load-side body.

The second plurality of conductive pin receptacles may be epoxied within the power-side connector base, the second plurality of conductive pin receptacles in non-conductive relation to one another and to the power-side body.

The first cavity of the load-side body may include a first abutment feature abutting against the other end of the load-side connector base biasing the load-side connector base towards the first contactor plate thereby compressing the first gasket. The second cavity of the power-side body may include a second abutment feature abutting against the other end of the power-side connector base biasing the power-side connector base towards the second contactor plate thereby compressing the second gasket.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 3B is a side view of the structure of FIG. 3A;

FIG. 3C is a sectional view through the structure of FIG. 3B;

FIG. 6A is a perspective view of an exemplary embodiment of a contact header assembly;

FIG. 6B is an end view of the structure of FIG. 6A;

FIG. 6C is a sectional view taken along lines 6C-6C from FIG. 6B;

DETAILED DESCRIPTION OF THE PREFERRED EMBODIMENTS

Figure 1:
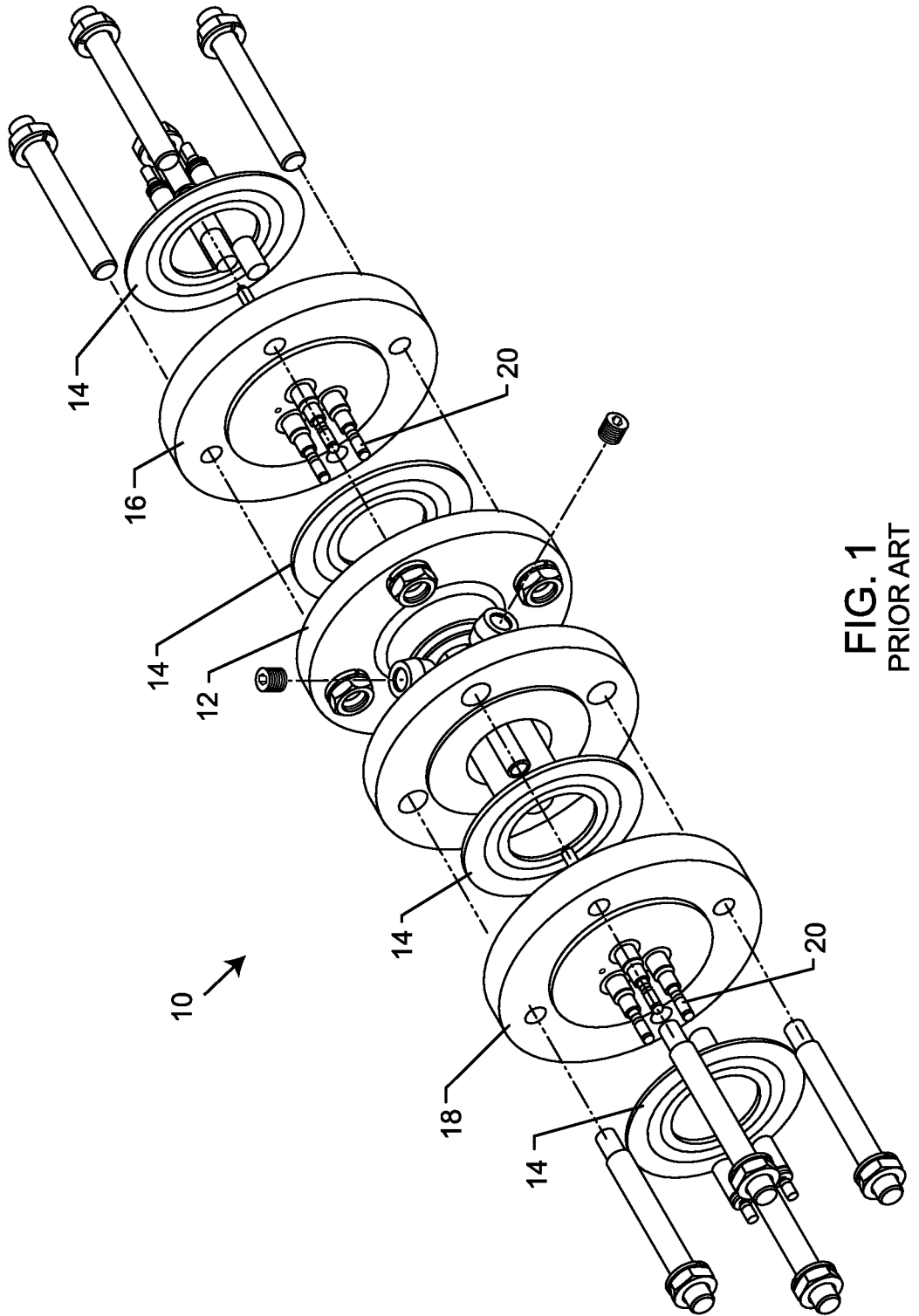
FIG. 1 is an exploded perspective view of a prior art cryogenic electrical power feed-through assembly.
Figure 2:
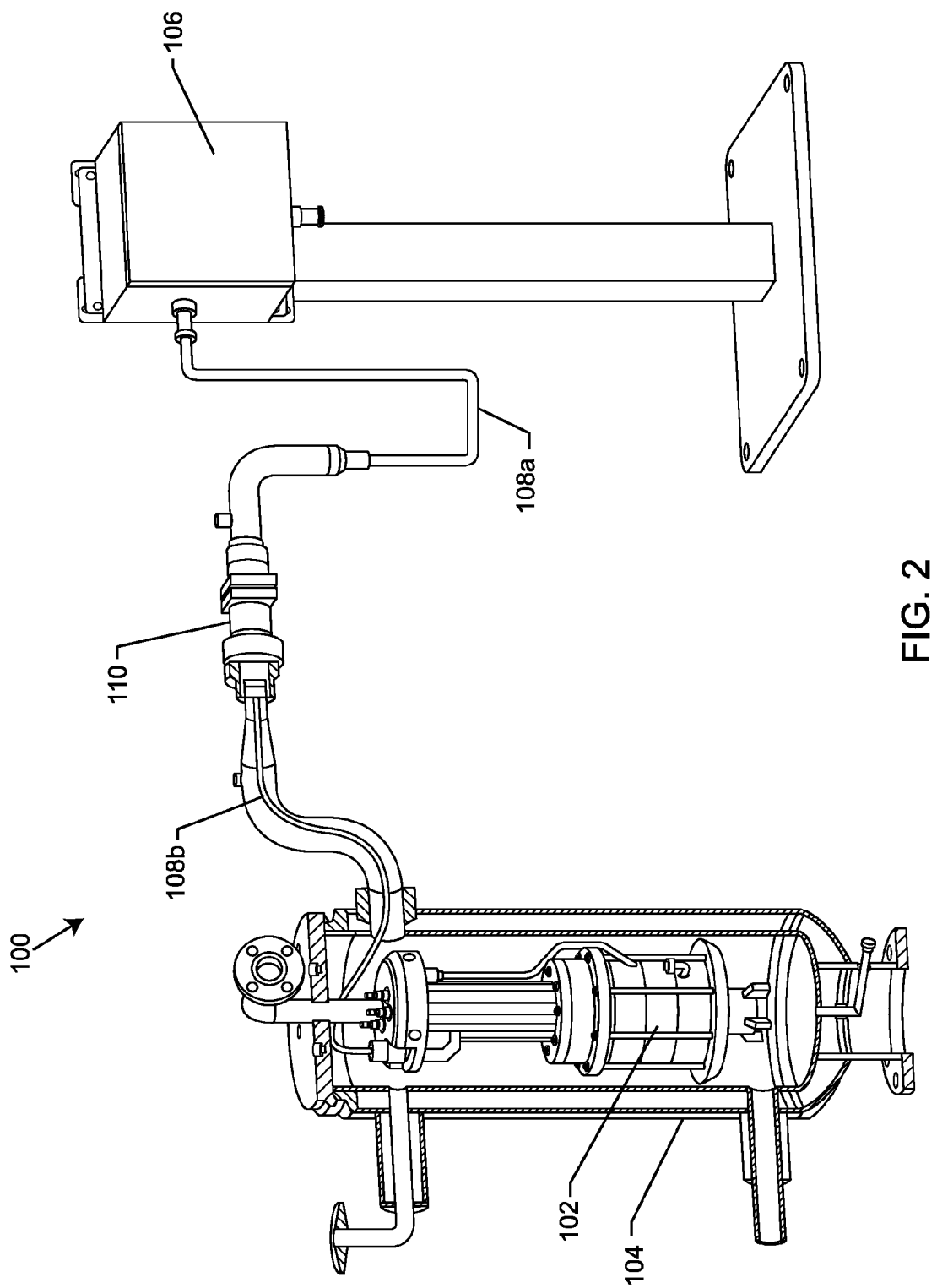
FIG. 2 is a perspective view of a cryogenic system utilizing a cryogenic electrical power feed-through assembly.

FIG. 2 is a perspective view of a cryogenic system 100. A cryogenic pump 102 is disposed within a cryogenic chamber 104. Power is provided to the pump 102 from a power supply box 106. From the power supply box 106 runs a power cable 108a. Electrical energy is provided from an atmospheric-side/power-side to inside the pump 102 on the load-side by passing electrical energy through the cryogenic electrical power feed-through assembly 110. On the load-side, the electrical energy flows through another power cable 108b to the pump 102.

Figure 3A:
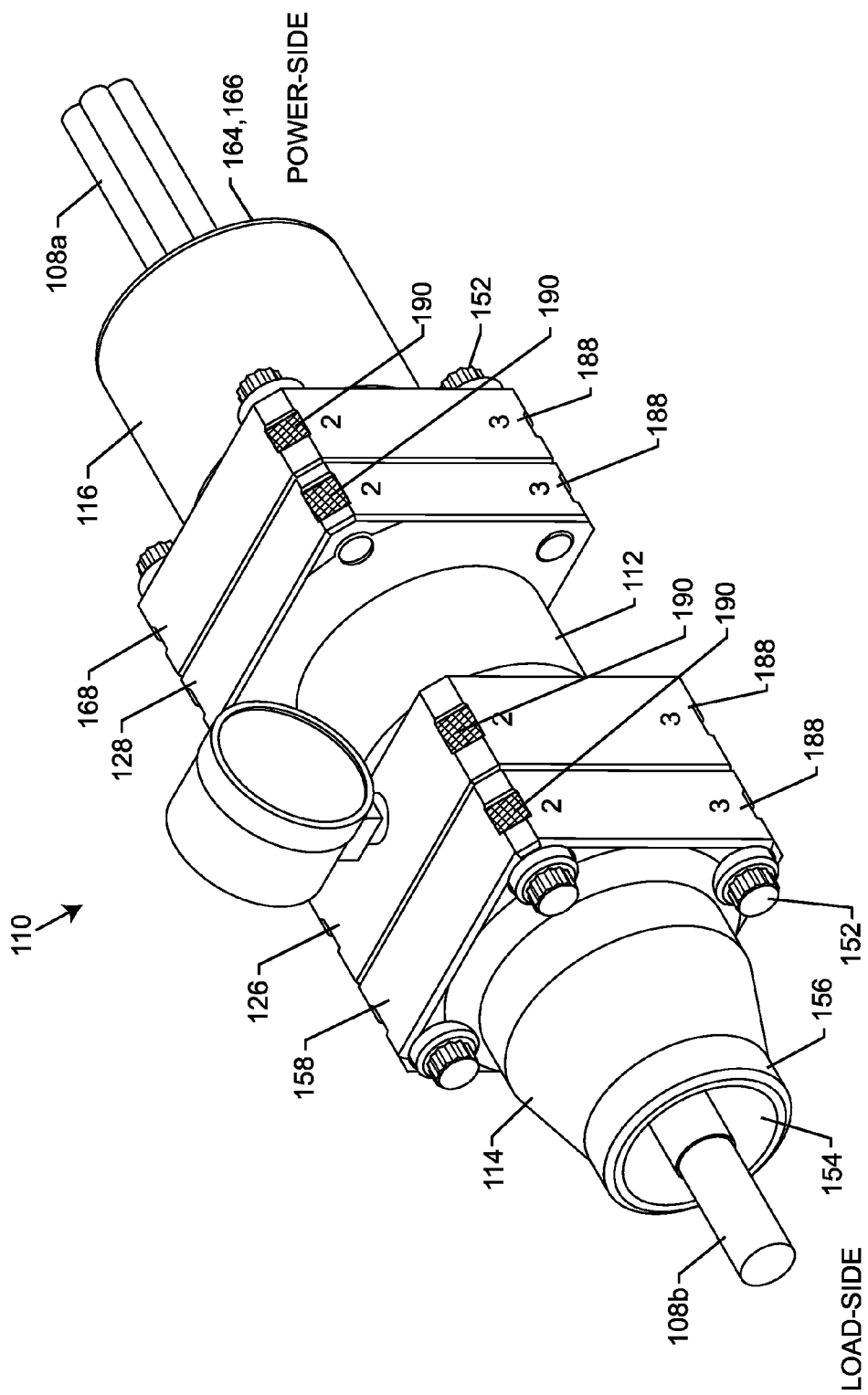
FIG. 3A is a perspective view of an exemplary embodiment of a cryogenic electrical power feed-through assembly of the present invention.

FIG. 3A is a perspective view of an exemplary embodiment of a cryogenic electrical power feed-through assembly 110. The feed-through assembly 110 can be subdivided into a contact header assembly 112, a load-side body 114 and a power-side body 116, where the load-side body 114 and power-side body 116 are attached to the contact header assembly 112.

Jumping ahead to FIGS. 6A-C, the contact header assembly 112 is shown in more detail. A feed-through body 118 has a feed-through body cavity 120 disposed therethrough extending between a first opening end 122 to a second opening end 124. The feed-through body 118 comprises an integrally formed first flange 126 disposed at the first opening end 122 and an integrally formed second flange 128 disposed at the second opening end 124. (In an alternative embodiment not shown, it is understood by those skilled in the art that the feed-through body 118 may be formed from multiple parts attached together through fasteners, bonding or welding.) The first and second flanges each comprise a plurality of fastener holes 130. As shown herein, the plurality of fastener holes 130 each comprise a female-thread such that a fastener 152 may be fixedly attached.

The feed-through body may be made from a variety of materials. For example, materials can include, but are not limited to, SS 316L, SS304, UNS S32205/S31803, S32750 or any other cryogenic & marine suitable materials.

Figure 7A:
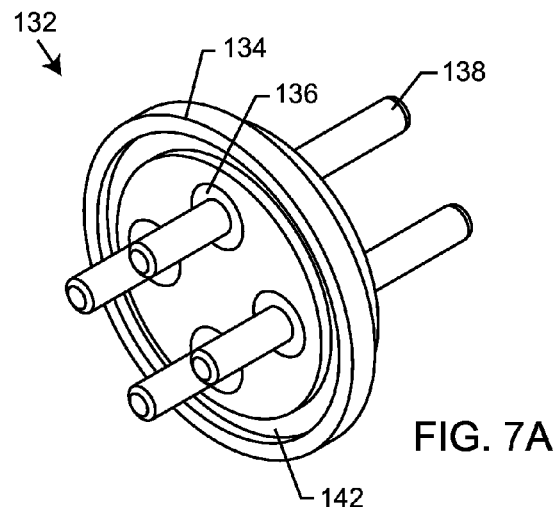
FIG. 7A is a perspective view of an exemplary embodiment of a contactor plate assembly.
Figure 7B:
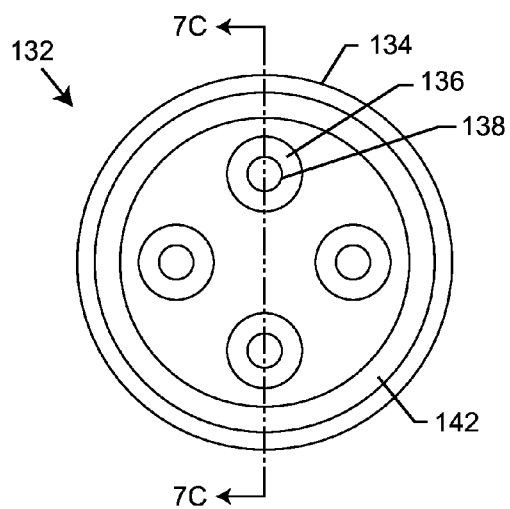
FIG. 7B is a front view of the structure of FIG. 7A.
Figure 7C:
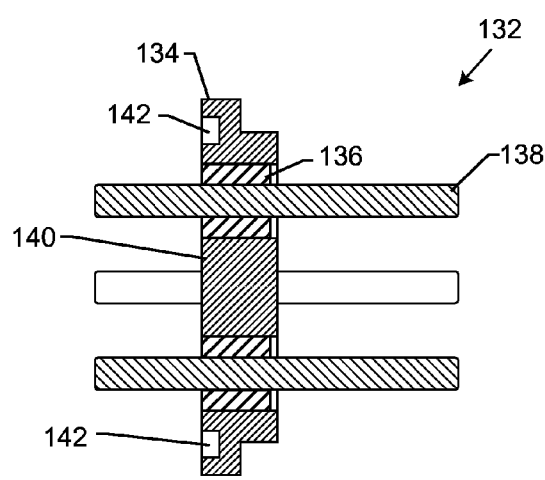
FIG. 7C is a sectional view taken along lines 7C-7C from FIG. 7B.

Jumping ahead again to FIGS. 7A-C, a contactor plate assembly 132 comprises a contactor plate 134 with a first plurality of insulative bushings 136 hermetically sealed to and extending through the first contactor plate 134. The insulative bushings are electrically non-conductive and can be made from glass or other insulative materials. A plurality of contact pins 138 are hermetically sealed to and extending through the first plurality of glass bushings 136. The plurality of contact pins 138 are electrically conductive and in non-conductive relation to the contactor plate 134 and feed-through body 118. The contact pins 138 can be made from, but are not limited to, copper cored nickel-iron alloy, gold plated or silver plated, or any other materials with good conductive properties combined with good strength at cryogenic conditions. Additional criteria for the pin material is so that the dimensional changes caused by temperature changes do not affect the fits with the glass sleeve.

An outwardly facing surface 140 of the contactor plate 134 comprises an annular groove 142. The annular groove 142 is larger in diameter and encompasses the plurality of glass bushings 136 and contact pins 138.

Referring back to FIGS. 6A-C, there is shown a first contactor plate assembly 132a and a second contact plate assembly 132b. As can be seen, the first and second plurality of contact pins 138a and 138b extend beyond both sides of their respective first and second contactor plates 134a and 134b. Also, the first plurality of contact pins 138a are respectively aligned to the second plurality of contact pins 138b.

Figures 8A, 8B:
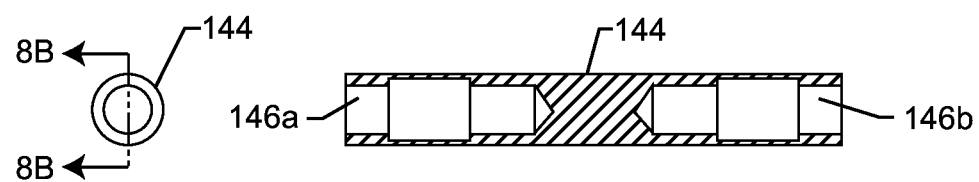
FIG. 8A is a front view of an exemplary embodiment of a conductive connector.
FIG. 8B is a sectional view taken along lines 8B-8B from FIG. 8A.
Figures 9A, 9B:
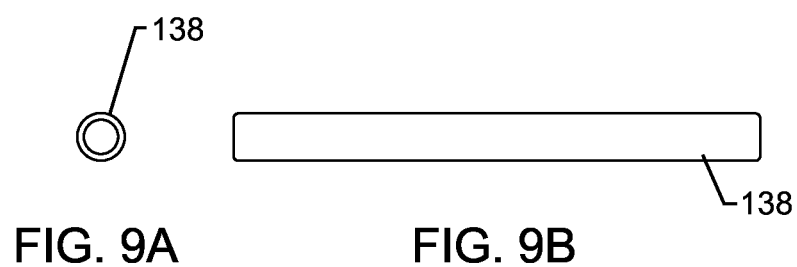
FIG. 9A is a front view of an exemplary embodiment of a conductive pin of the present invention.
FIG. 9B is a side view of the structure of FIG. 9A.

The first plurality of contact pins 138a are electrically coupled to the second plurality of contact pins 138b. This is accomplished with the use of a plurality of electrically conductive connectors 144, as best shown in FIGS. 8A-B. Each connector 144 comprises a first socket end 146a opposite a second socket end 146b. The plurality of connectors 144 electrically connect the plurality of first contact pins 138a to the plurality of second contact pins 138b. As can be seen in FIG. 6C, the first plurality of contact pins 138a are partially disposed respectively within the first socket ends 146a and the second plurality of contact pins 138b are partially disposed respectively within the second socket ends 146b. The connectors 144 may be made from, but are not limited to, copper alloys which can then be gold plated or silver plated, or any other materials with good conductive properties combined with good strength at cryogenic conditions.

Figures 10A, 10B:
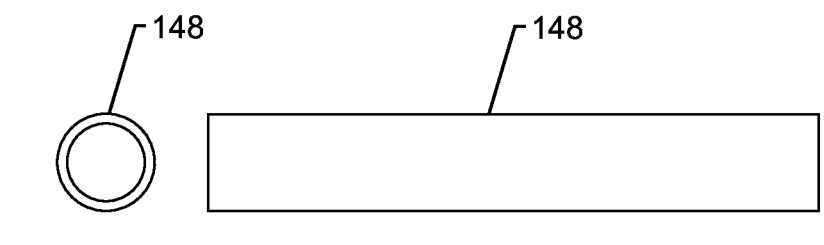
FIG. 10A is a front view of an exemplary embodiment of an insulative sleeve of the present invention.
FIG. 10B is a side view of the structure of FIG. 10A.

As shown in FIG. 6C, a plurality of insulative sleeves 148 from FIGS. 10A-B are disposed around the plurality of connectors 144. The insulative sleeves are hollow in the center and contain the connectors 144 within. The insulative sleeves may be made from, but are not limited to, Nomex, G10, or other materials may be used which have dielectric strength of more than 0.2 kV/mm & are suitable for operating conditions below −20 degrees Celsius.

As can be seen in FIGS. 6A-C, the first contactor plate assembly 132 is disposed at and hermetically seals the first opening end 122 of the feed-through body 118 with a first electron beam weld 150a between the first contactor plate 134 and the first opening end 122. Similarly, the second contactor plate assembly 132 is disposed at and hermetically seals the second opening end 124 of the feed-through body 118 with a second electron beam weld 150b between the second contactor plate and the second opening end. Rather than using a compressible seal, a weld 150 is much stronger and more reliable once formed. When the welds 150 are completed, the contact header assembly 112 is completed. Other types of suitable welds are may be used such as laser welds.

Figures 4A, 4B, 4C:
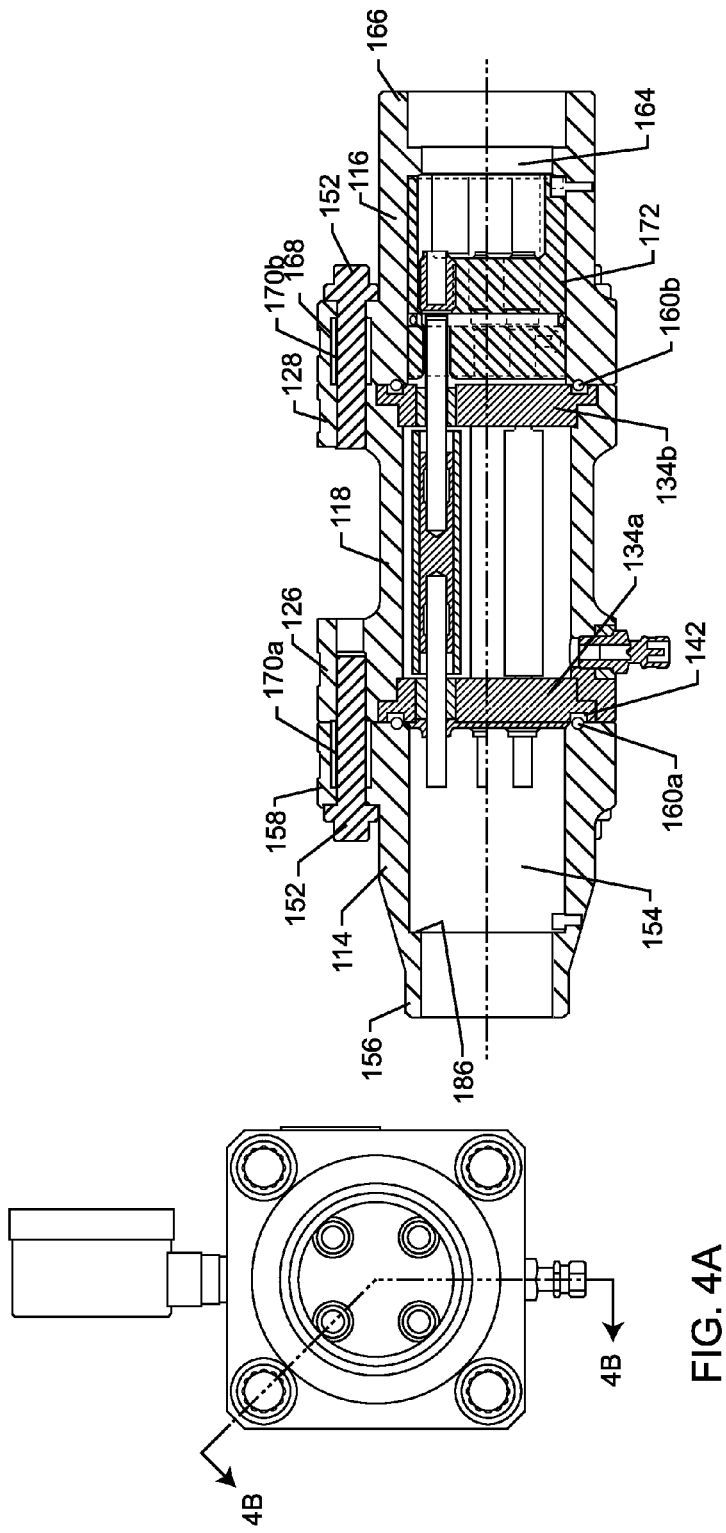
FIG. 4A is an end view of another exemplary embodiment of a cryogenic electrical power feed-through assembly of the present invention.
FIG. 4B is a sectional view taken along lines 4B-4B of FIG. 4A.
FIG. 4C is a top view of the structure of FIGS. 4A and 4B.

FIGS. 4A-C show another embodiment of a cryogenic electrical power feed-through assembly. A load-side body 114 forms a first cavity 154 disposed therethrough extending between a first fitting end 156 to a load-side flanged end 158. The load-side flanged end 158 of the load-side body 114 is connected to the first flange 126 of the feed-through body 118. The load-side flanged end 158 comprises a load-side plurality of fastener holes 170a aligned to the plurality of fastener holes of the first flange of the feed-through body.

A first seal 160a is disposed within the first annular groove 142. The first seal 160a is compressed between the first contactor plate 134a and the load-side flanged end 158. As shown herein, the first seal 160a may be an o-ring type seal. Other types of seal that could be used include energized seals. As shown in FIG. 4B, a connector base 172 has been removed from the load-side such that it is easier to view the structure within the load-side body 114.

A power-side body 116 forms a second cavity 164 disposed therethrough extending between a second fitting end 166 to a power-side flanged end 168. The power-side flanged end 168 of the power-side body 116 is connected to the second flange 128 of the feed-through body 118. The power-side flanged end 168 comprises a power-side plurality of fastener holes 170b aligned to the plurality of fastener holes of the second flange 128 of the feed-through body 118.

A second seal 160b is disposed within the second annular groove 142, where the second seal 160b is compressed between the second contactor plate 134b and the power-side flanged end 168.

It can be seen in FIGS. 4B and 4C that the load-side body 114 is different than the power-side body 118. For instance, the load-side body 114 shown here is a weldneck fitting type. Whereas, the power-side body 118 shown here is a female pipe fitting type or a socket weld fitting type. Alternatively, the load-side and power-side fittings could be of the same type.

As best seen in FIG. 3C, a load-side connector base 172a has at one end 174 a first plurality of conductive pin receptacles 176 configured to receive the first plurality of contact pins. The first plurality of conductive pin receptacles 176 are connectable to a load side conductor 108b at the other end 178. A first circumferential vapor seal 180 is between an outside surface 182 of the load-side connector base 174 and an inside surface 184 of the load-side body. As shown herein, the outside surface of the load-side connector base is a circumferential groove 182. A power-side connector base has the same construction as the load-side connector base.

The load-side and power-side connector bases are pushed into contact by an abutment feature 186. The abutment feature 186 is a step or smaller diameter surface that is smaller in diameter or size as compared to the connector base 172. In this way the abutment feature 186 forces the connector base 172 into position.

The plurality of conductive pin receptacles 176 may be epoxied within the connector base 174. This prevents cryogenic fluid from passing through small gaps between the pin receptacles 176 and the connector base 174.

As is best seen in FIG. 3A, the first flange 126, second flange 128, load-side flange end 158 and the power-side flange end 168 each comprise an outer rectangular (square) surface. Having the flanges shaped into rectangular surfaces helps to properly align them during assembly and also prevents other common flanges that may be in the vicinity from being used. This means the flanges are each a non-standard ANSI-type flange. This prevents common ANSI-type flanges from being used to connect up to the embodiments disclosed herein.

As a further aid in proper assembly, at least one side of each outer rectangular surface may include a repeated indicia 188 that is aligned along a length of the cryogenic electrical power feed-through assembly. For example, the indicia 188 shown here are the numerals 1, 2, 3 and 4. However, other words or numbers may be used. The indicia 188 allows a technician to quickly visually verify that all the parts are properly connected. Furthermore, the indicia can be color coded portions 190. For example, the color red, blue, green, brown or any other color or combination can be used so that it is easy for a technician to visually identify whether the assembly is correct or incorrect.

To further aid in proper assembly, the first and second flange each may include at least one anti-rotation pin feature, where the anti-rotation pin feature is non-symmetrically aligned with respect to the plurality of fastener holes. This means that if the orientation was not proper, the first flange 126 would not be able to mate up to the load-side flange end 166. The parts would simply not go together. This anti-rotation pin feature 192 can also be used between the load-side and power-side bodies and the connector base 172. The pin 192 prevents rotation of the connector base 172 relative to the load-side and power-side bodies.

Figure 3D:
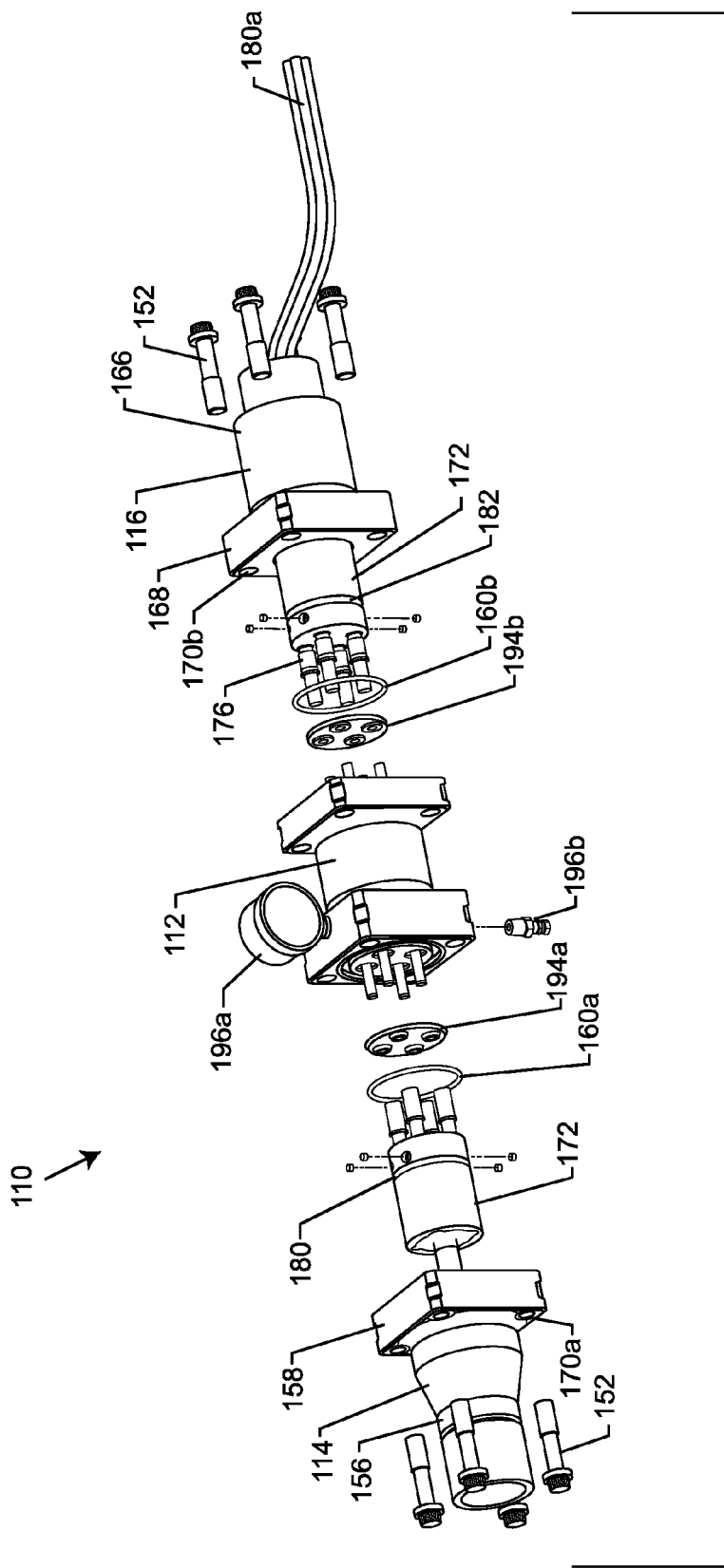
FIG. 3D is a perspective exploded view of the structure of FIG. 3A.

As best seen in FIGS. 3C-D a first gasket 194a is between the load-side connector base and the first contactor plate. The first gasket 194a comprises a plurality of holes configured to facilitate the first plurality of contact pins extending through. The first gasket 194 is smaller in diameter in comparison to the first seal. A second gasket 194b is between the power-side connector base and the second contactor plate.

Figure 4D:
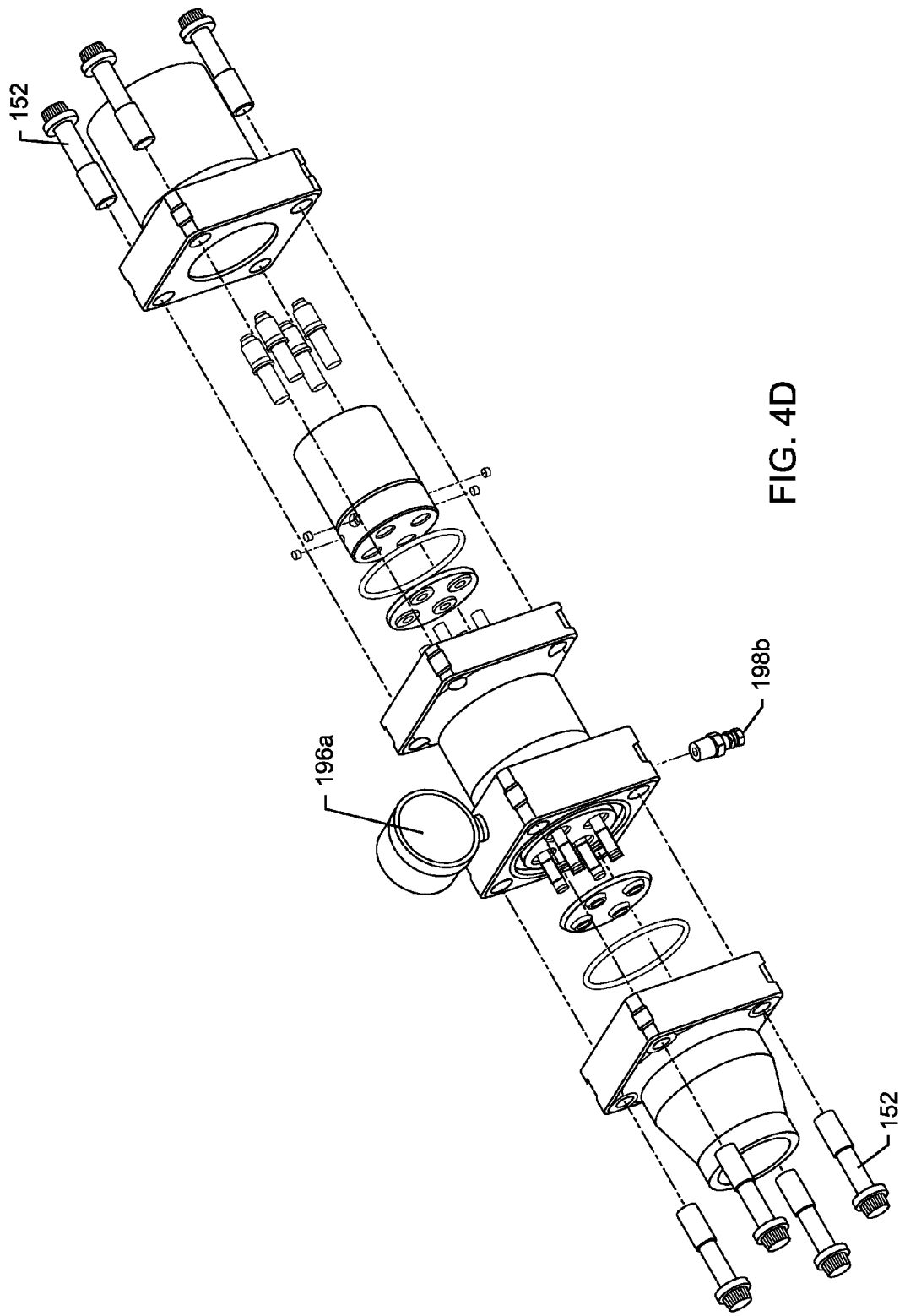
FIG. 4D is a perspective exploded view of the structure of FIGS. 4A-C.
Figures 5A, 5B:
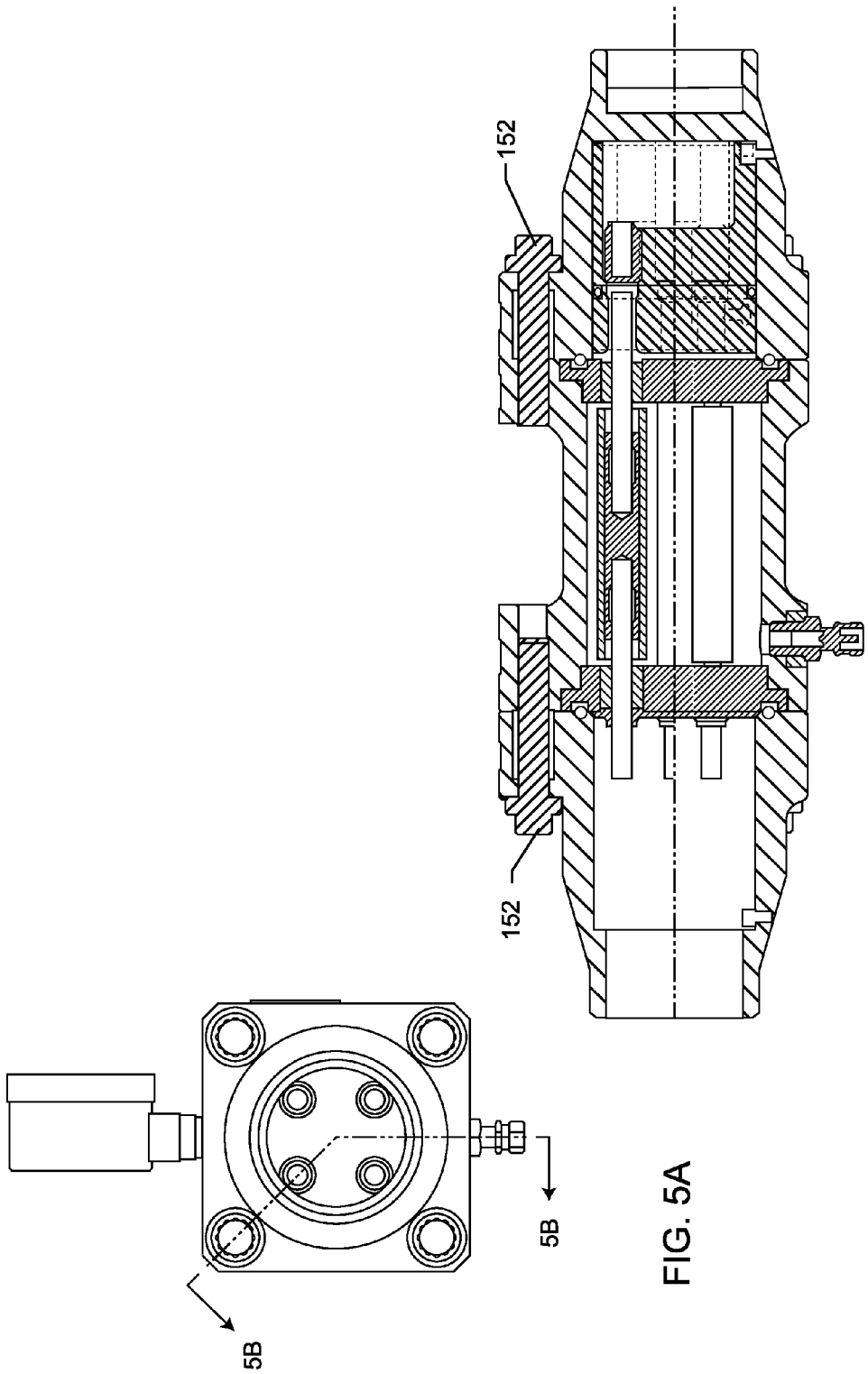
FIG. 5A is an end view of another exemplary embodiment of a cryogenic electrical power feed-through assembly of the present invention.
FIG. 5B is a sectional view taken along lines 5B-5B of FIG. 5A.

As best shown in FIG. 4D, a pressure valve 196 is disposed within the feed-through body in pressurized communication with the feed-through body cavity. The pressure valve 196 may be other types of valves as well. For example, a Schrader valve 198 may also be disposed within the feed-through body in pressurized communication with the feed-through body cavity The plurality of fasteners 152 fastening the first flange to the load-side flanged end and fastening the second flange to the power-side flanged end may be captive fasteners. The captive fasteners are captured with respect to the load-side and power-side flanged ends such that they are not lost or that a technician attempts to install non-compliant fasteners. The fasteners 152 may have a distal threaded end with a proximal unthreaded portion, such that the fasteners 152 are captured within the load-side and power-side flanged ends.

The electrical power feed-through of the present invention provides an electrical path for conducting electrical power through the pressure boundary of an LNG (Liquid Nitrogen Gas) or other cryogenic fluids process or storage system. The electrical power feed-through prevents leakage of LNG or other cryogenic fluids or vapors thereof from a pressurized process or storage system to the atmosphere, and to prevent the ingress of air into a low pressure vapor space in a cryogenic system, thereby avoiding a potentially flammable or explosive atmosphere.

The electrical power feed-through may embody the following features: (1) an electrical connector that serves as a thermal barrier to limit the heat inleak from the ambient atmosphere to the cryogenic process; (2) an electrical connector that incorporates a vapor seal that prevents the transmission of LNG vapor from the process load side to the ambient atmosphere or to the process side terminal header; (3) an electrical connector that incorporates a plurality of terminal pin sockets that each embody a barrier and are sealed within a barrier compound that prevents the leakage of fluid through the cables into the process side terminal header; (4) a stainless body through a cylindrical bore at each end of which is a counterbore into which is fitted; a stainless steel process side terminal header into and through which a plurality of terminal pins, normally three or four depending upon on the number of electrical circuits to be fed through, each of which is bonded to and electrically isolated from one another and from the terminal header, by an individual or common glass insulator, the arrangement of the bonded glass insulator serves also to seal one side of the terminal header; a similar stainless steel power system side terminal header into and through which a plurality of terminal pins penetrates in a manner described above; a plurality of insulated electrical couplers which are used to connect the each power side terminals to a corresponding such process side terminal; a plurality of Nomex® tubular insulators one of which is installed on the outside surface of each coupler; a seal weld that retains each terminal header in the body such that no fluid, either or gas may pass from either end of the feedthrough into the cavity within the unit, nor any fluid escape therefrom, and prevents the ingress of any potentially explosive or flammable mixture from the ambient atmosphere into the feedthrough cavity; a pair of small penetrations through which a barrier fluid may be introduced into the cavity, and each of which is provided with a means of closing the cavity thereby completely isolating such cavity from the ambient atmosphere; a main pressure seal gasket that prevents leakage of process fluid from the process to the ambient atmosphere; a power system seal gasket that prevents the ingress of a potentially explosive or flammable mixture of air and process vapor into the enclosed power system, including cable conduit, junction boxes and/or electrical panels; a system of markers and labels that permits the installer of the feedthrough and its accessories to ensure that the power phase relationship remains consistent through the entire power wiring sequence, from motor leads to the power supply; means are provided to ensure that the main pressure retaining bolts are retained by the mating flanges to prevent their inadvertent replacement by bolts the qualification of which is unsuitable for the purpose.

Each of the terminal headers is electron beam seal welded into the body of the dual process seal feedthrough whereas the previous art depends on a gasket or O-ring to prevent leak of the pressure barrier gas. Such gas leakage can result in spurious alarms indicating seal failure, and can result in the ultimate loss of the barrier gas, potentially allowing the process gas into the isolation chamber. Further, the present invention embodies additional dual o-ring seals on the process side that act as preventative seal to reduce the prospect of process gas to the surrounding ambient area, (potentially creating an explosive atmosphere) and preventing the process gas from reaching the terminal pin seals. Further, the wire connection sockets that engage the terminal pins are sealed in a manner that prevents the infiltration of process gas along the interstices in the cable lay, into the terminal header area of the load side terminal pin seals.

The various embodiments disclosed herein may meet (but are not limited to) requirements of the:
1) USA National Code (NFPA 70); NFPA 59A (US): Standard for the Production, Storage, and Handling of Liquefied Natural Gas (LNG);
2) ANSI/ISA-12.27.01-2011: Requirements for Process sealing Between Electrical Systems and Flammable or Combustible Process Fluids;
3) EU CSN EN 1473: Installation and equipment for liquefied natural gas—Design of onshore installations;
4) EU ATEX 95 equipment directive 94/9/EC: Equipment and protective systems intended for use in potentially explosive atmospheres;
5) IEC Ex 01-System for Certification to Standards relating to Equipment for use in Explosive Atmospheres (IECEx System)—Basic Rules;
6) IEC Standard 60079-0: Explosive atmospheres—Part 0: Equipment—General requirements;
7) IECEX 60079-2 Explosive atmospheres—Part 2: Equipment protection by pressurized enclosures 'p'; USA and CSA equivalent standards;
8) ASME BPV Code Section 8 division 1; and
9) EU Pressure Equipment Directive (97/23/EC).

NUMERALS 10 cryogenic electrical power feed-through assembly, prior art
12 contact header assembly, prior art
14 seal, prior art
16 power-side flange, prior art
18 load-side flange, prior art
20 conductive contact pins, prior art
100 cryogenic system
102 cryogenic pump
104 cryogenic chamber
106 power supply box
108 power cable
110 cryogenic electrical power feed-through assembly
112 contact header assembly
114 load-side body
116 power-side body
118 feed-through body
120 cavity, feed-through body
122 first opening end, feed-through body
124 second opening end, feed-through body
126 first flange, feed-through body
128 second flange, feed-through body
130 a plurality of fastener holes, feed-through body
132 contactor plate assembly
134 contactor plate, contactor plate assembly
136 insulative bushings, contactor plate assembly
138 plurality of contact pins, contactor plate assembly
140 outwardly facing surface, contactor plate assembly
142 annular groove, contactor plate assembly
144 a plurality of electrically conductive connectors
146 socket end, conductive connectors
148 plurality of insulative sleeves, conductive connectors
150 weld
152 fastener
154 first cavity, load-side body
156 first fitting end, load-side body
158 load-side flanged end, load-side body
160 seal, o-ring
164 second cavity, power-side body
166 second fitting end, power-side body
168 power-side flanged end, power-side body
170 fastener holes
172 connector base
174 one end, connector base
176 plurality of conductive pin receptacles, connector base
178 other end, connector base
180 circumferential vapor seal, connector base
182 outside surface/circumferential groove, connector base
184 inside surface, load-side or power-side body
186 abutment feature, load-side or power-side
188 indicia, numerals
190 indicia, colors
192 anti-rotation pin feature
194 gasket
196 pressure valve Although several embodiments have been described in detail for purposes of illustration, various modifications may be made to each without departing from the scope and spirit of the invention. Accordingly, the invention is not to be limited, except as by the appended claims.

What is claimed is:
1. A contact header assembly configured to be installed as part of a cryogenic electrical power feed-through assembly, the contact header assembly comprising:
a) a feed-through body having a feed-through body cavity disposed therethrough extending between a first opening end to a second opening end, wherein the feed-through body includes an integrally formed first flange disposed at the first opening end, and the feed-through body further includes an integrally formed second flange disposed at the second opening end;
b) a first contactor plate assembly comprising:
  i) a first contactor plate;
  ii) a first plurality of insulative bushings hermetically sealed to and extending through the first contactor plate;
  iii) a first plurality of contact pins hermetically sealed to and extending through the first plurality of insulative bushings, wherein the first plurality of contact pins are electrically conductive and in non-conductive relation to the first contactor plate and feed-through body;
c) a second contactor plate assembly comprising:
  i) a second contactor plate;
  ii) a second plurality of insulative bushings hermetically sealed to and extending through the second contactor plate;
  iii) a second plurality of contact pins hermetically sealed to and extending through the second plurality of insulative bushings, wherein the second plurality of contact pins are electrically conductive and in non-conductive relation to the second contactor plate;
d) wherein the first contactor plate assembly is disposed at and hermetically seals the first opening end of the feed-through body with a first electron beam weld formed between the first contactor plate and the first opening end; and
e) wherein the second contactor plate assembly is disposed at and hermetically seals the second opening end of the feed-through body with a second electron beam weld formed between the second contactor plate and the second opening end.

2. The contact header assembly of claim 1, wherein a first outwardly facing surface of the first contactor plate comprises a first annular groove, the first annular groove encompassing the first plurality of insulative bushings and contact pins, and wherein a second outwardly facing surface of the second contactor plate comprises a second annular groove, the second annular groove encompassing the second plurality of insulative bushings and contact pins.

3. The contact header assembly of claim 1, wherein the first and second flanges each comprise a plurality of fastener holes, wherein the plurality of fastener holes each comprise a female-thread.

4. The contact header assembly of claim 1, wherein the first flange and second flange each comprise an outer rectangular surface.

5. The contact header assembly of claim 1, including a load-side body forming a first cavity disposed therethrough extending between a first fitting end to a load-side flanged end, wherein the load-side flanged end of the load-side body is connected to the first flange of the feed-through body, and including a first seal disposed within the first annular groove, the first seal compressed between the first contactor plate and the load-side flanged end.

6. The contact header assembly of claim 5, including a power-side body forming a second cavity disposed therethrough extending between a second fitting end to a power-side flanged end, wherein the power-side flanged end of the power-side body is connected to the second flange of the feed-through body, and including a second seal disposed within the second annular groove, the second seal compressed between the second contactor plate and the power-side flanged end.

7. The contact header assembly of claim 6, wherein the first fitting end or the second fitting end comprises a weld-neck fitting, a socket weld fitting or a female pipe fitting.

8. The contact header assembly of claim 6, wherein the load-side flanged end comprises a load-side plurality of fastener holes aligned to the plurality of fastener holes of the first flange of the feed-through body, and wherein the power-side flanged end comprises a power-side plurality of fastener holes aligned to the plurality of fastener holes of the second flange of the feed-through body.

9. The contact header assembly of claim 8, wherein the load-side plurality of fastener holes and the power-side plurality of fastener holes each comprise a female threaded portion adjacent to a female unthreaded portion.

10. The contact header assembly of claim 6, including a load-side connector base having at one end a first plurality of conductive pin receptacles configured to receive a portion of each of the first plurality of contact pins, where the first plurality of conductive pin receptacles are connectable to a load side conductor at the other end.

11. The contact header assembly of claim 10, including a power-side connector base having at one end a second plurality of conductive pin receptacles configured to receive a portion of each of the second plurality of contact pins, where the second plurality of conductive pin receptacles are connectable to a power side conductor at the other end.

12. The contact header assembly of claim 11, including a first circumferential vapor seal between an outside surface of the load-side connector base and an inside surface of the load-side body, and including a second circumferential vapor seal between an outside surface of the power-side connector base and an inside surface of the power-side body.

13. The contact header assembly of claim 12, including a first gasket between the load-side connector base and the first contactor plate, the first gasket comprising a plurality of holes configured to facilitate the first plurality of contact pins extending therethrough, wherein the first gasket is smaller in diameter in comparison to the first seal, and including a second gasket between the power-side connector base and the second contactor plate, the second gasket comprising a plurality of holes configured to facilitate the second plurality of contact pins extending therethrough, wherein the second gasket is smaller in diameter in comparison to the second seal.

14. The contact header assembly of claim 13, wherein the first cavity of the load-side body includes a first abutment feature abutting against the other end of the load-side connector base biasing the load-side connector base towards the first contactor plate thereby compressing the first gasket.

15. The contact header assembly of claim 14, wherein the second cavity of the power-side body includes a second abutment feature abutting against the other end of the power-side connector base biasing the power-side connector base towards the second contactor plate thereby compressing the second gasket.

16. The contact header assembly of claim 11, wherein the first plurality of conductive pin receptacles are epoxied within the load-side connector base, the first plurality of conductive pin receptacles in non-conductive relation to one another and to the load-side body.

17. The contact header assembly of claim 16, wherein the second plurality of conductive pin receptacles are epoxied within the power-side connector base, the second plurality of conductive pin receptacles in non-conductive relation to one another and to the power-side body.

18. The contact header assembly of claim 6, wherein the first flange, second flange, load-side flanged end and power-side flanged end each comprises an outer rectangular surface.

19. The contact header assembly of claim 18, wherein at least one side of each outer rectangular surface comprises a repeated indicia that is aligned along a length of the cryogenic electrical power feed-through assembly.

20. The contact header assembly of claim 18, including a plurality of fasteners fastening the first flange to the load-side flanged end and fastening the second flange to the power-side flanged end, wherein the plurality of fasteners comprise captive fasteners, the captive fasteners captured with respect to the load-side and power-side flanged ends.

21. The contact header assembly of claim 6, wherein the first flange, second flange, load-side flanged end and power-side flanged end each comprises a non-standard ANSI-type flange.

22. The contact header assembly of claim 1, wherein the first and second plurality of contact pins extend beyond both sides of their respective first and second contactor plates.

23. The contact header assembly of claim 22, wherein the first plurality of contact pins are respectively aligned to the second plurality of contact pins.

24. The contact header assembly of claim 23, wherein the first plurality of contact pins are electrically coupled to the second plurality of contact pins.

25. The contact header assembly of claim 1, including a plurality of electrically conductive connectors, each connector comprising a first socket end opposite a second socket end, wherein the plurality of connectors electrically connect the plurality of first contact pins to the plurality of second contact pins.

26. The contact header assembly of claim 25, wherein the first plurality of contact pins are partially disposed respectively within the first socket ends and the second plurality of contact pins are partially disposed respectively within the second socket ends.

27. The contact header assembly of claim 26, including a plurality of insulative sleeves disposed around the plurality of connectors.

28. The contact header assembly of claim 1, wherein the first and second flange each comprise at least one anti-rotation pin feature, where the anti-rotation pin feature is non-symmetrically aligned with respect to the plurality of fastener holes.

29. The contact header assembly of claim 1, including a pressure valve disposed within the feed-through body in pressurized communication with the feed-through body cavity.

30. The contact header assembly of claim 1, wherein the first plurality of insulative bushings comprise glass bushings.

31. A cryogenic electrical power feed-through assembly, comprising:
- a) a contact header assembly comprising:
  - i) a feed-through body having a feed-through body cavity disposed therethrough extending between a first opening end to a second opening end, the feed-through body comprising an integrally formed first flange disposed at the first opening end, and the feed-through body comprising an integrally formed second flange disposed at the second opening end, wherein the first and second flanges each comprise a plurality of fastener holes, wherein the plurality of fastener holes each comprise a female-thread;
  - ii) a first contactor plate assembly comprising:
    - 1) a first contactor plate;
    - 2) a first plurality of glass bushings hermetically sealed to and extending through the first contactor plate;
    - 3) a first plurality of contact pins hermetically sealed to and extending through the first plurality of glass bushings, wherein the first plurality of contact pins are electrically conductive and in non-conductive relation to the first contactor plate and feed-through body;
    - iv) a first outwardly facing surface of the first contactor plate comprises a first annular groove, the first annular groove encompassing the first plurality of glass bushings and contact pins;
  - iii) a second contactor plate assembly comprising:
    - 1) a second contactor plate;
    - 2) a second plurality of glass bushings hermetically sealed to and extending through the second contactor plate;
    - 3) a second plurality of contact pins hermetically sealed to and extending through the second plurality of glass bushings, wherein the second plurality of contact pins are electrically conductive and in non-conductive relation to the second contactor plate;
    - 4) a second outwardly facing surface of the second contactor plate comprises a second annular groove, the second annular groove encompassing the second plurality of glass bushings and contact pins;
  - iv) wherein the first and second plurality of contact pins extend beyond both sides of their respective first and second contactor plates;
  - v) wherein the first plurality of contact pins are respectively aligned to the second plurality of contact pins;
  - vi) wherein the first plurality of contact pins are electrically coupled to the second plurality of contact pins;
  - vii) wherein the first contactor plate assembly is disposed at and hermetically seals the first opening end of the feed-through body with a first electron beam weld between the first contactor plate and the first opening end;
  - viii) wherein the second contactor plate assembly is disposed at and hermetically seals the second opening end of the feed-through body with a second electron beam weld between the second contactor plate and the second opening end;
- b) a load-side body forming a first cavity disposed therethrough extending between a first fitting end to a load-side flanged end, wherein the load-side flanged end of the load-side body is connected to the first flange of the feed-through body, wherein the load-side flanged end comprises a load-side plurality of fastener holes aligned to the plurality of fastener holes of the first flange of the feed-through body;
- c) a first seal disposed within the first annular groove, the first seal compressed between the first contactor plate and the load-side flanged end;
- d) a power-side body forming a second cavity disposed therethrough extending between a second fitting end to a power-side flanged end, wherein the power-side flanged end of the power-side body is connected to the second flange of the feed-through body, wherein the power-side flanged end comprises a power-side plurality of fastener holes aligned to the plurality of fastener holes of the second flange of the feed-through body;

e) a second seal disposed within the second annular groove, the second seal compressed between the second contactor plate and the power-side flanged end;
f) a load-side connector base having at one end a first plurality of conductive pin receptacles configured to receive the first plurality of contact pins, where the first plurality of conductive pin receptacles are connectable to a load side conductor at the other end;
g) a power-side connector base having at one end a second plurality of conductive pin receptacles configured to receive the second plurality of contact pins, where the second plurality of conductive pin receptacles are connectable to a power side conductor at the other end;
h) a first circumferential vapor seal between an outside surface of the load-side connector base and an inside surface of the load-side body; and
i) a second circumferential vapor seal between an outside surface of the power-side connector base and an inside surface of the power-side body.

32. The contact header assembly of claim 31, including a first gasket between the load-side connector base and the first contactor plate, the first gasket comprising a plurality of holes configured to facilitate the first plurality of contact pins extending therethrough, wherein the first gasket is smaller in diameter in comparison to the first seal, and including a second gasket between the power-side connector base and the second contactor plate, the second gasket comprising a plurality of holes configured to facilitate the second plurality of contact pins extending therethrough, wherein the second gasket is smaller in diameter in comparison to the second seal.

33. The contact header assembly of claim 31, wherein the first fitting end or the second fitting end comprises a weldneck fitting, a socket weld fitting or a female pipe fitting.

34. The contact header assembly of claim 31, wherein the load-side plurality of fastener holes and the power-side plurality of fastener holes each comprise a female threaded portion adjacent to a female unthreaded portion.

35. The contact header assembly of claim 31, including a plurality of electrically conductive connectors, each connector comprising a first socket end opposite a second socket end, wherein the plurality of connectors electrically connect the plurality of first contact pins to the plurality of second contact pins.

36. The contact header assembly of claim 35, wherein the first plurality of contact pins are partially disposed respectively within the first socket ends and the second plurality of contact pins are partially disposed respectively within the second socket ends.

37. The contact header assembly of claim 36, including a plurality of insulative sleeves disposed around the plurality of connectors.

38. The contact header assembly of claim 31, wherein the first and second flange each comprise at least one antirotation pin feature, where the anti-rotation pin feature is non-symmetrically aligned with respect to the plurality of fastener holes.

39. The contact header assembly of claim 31, including a pressure valve disposed within the feed-through body in pressurized communication with the feed-through body cavity.

40. The contact header assembly of claim 31, wherein the first flange, second flange, load-side flanged end and power-side flanged end each comprises an outer rectangular surface.

41. The contact header assembly of claim 40, wherein at least one side of each outer rectangular surface comprises a repeated indicia that is aligned along a length of the cryogenic electrical power feed-through assembly.

42. A cryogenic electrical power feed-through assembly, comprising:
a) a contact header assembly comprising:
i) a feed-through body having a feed-through body cavity disposed therethrough extending between a first opening end to a second opening end, the feed-through body comprising a first flange disposed at the first opening end, and the feed-through body comprising a second flange disposed at the second opening end;
ii) a first contactor plate assembly comprising:
1) a first contactor plate;
2) a first plurality of insulative bushings hermetically sealed to and extending through the first contactor plate;
3) a first plurality of contact pins hermetically sealed to and extending through the first plurality of insulative bushings, wherein the first plurality of contact pins are electrically conductive and in non-conductive relation to the first contactor plate and feed-through body;
iv) a first outwardly facing surface of the first contactor plate comprises a first annular groove, the first annular groove encompassing the first plurality of insulative bushings and contact pins;
iii) a second contactor plate assembly comprising:
1) a second contactor plate;
2) a second plurality of insulative bushings hermetically sealed to and extending through the second contactor plate;
3) a second plurality of contact pins hermetically sealed to and extending through the second plurality of insulative bushings, wherein the second plurality of contact pins are electrically conductive and in non-conductive relation to the second contactor plate;
4) a second outwardly facing surface of the second contactor plate comprises a second annular groove, the second annular groove encompassing the second plurality of insulative bushings and contact pins;
iv) wherein the first and second plurality of contact pins extend beyond both sides of their respective first and second contactor plates;
v) a plurality of electrically conductive connectors, each connector comprising a first socket end opposite a second socket end, wherein the plurality of electrically conductive connectors electrically connect the plurality of first contact pins to the plurality of second contact pins;
vi) wherein the first contactor plate assembly is disposed at and hermetically seals the first opening end of the feed-through body with a first electron beam weld between the first contactor plate and the first opening end; and
vii) wherein the second contactor plate assembly is disposed at and hermetically seals the second opening end of the feed-through body with a second electron beam weld between the second contactor plate and the second opening end;
b) a load-side body forming a first cavity disposed therethrough extending between a first fitting end to a load-side flanged end, wherein the load-side flanged end of the load-side body is connected to the first flange of the feed-through body;

c) a first seal disposed within the first annular groove, the first seal compressed between the first contactor plate and the load-side flanged end;

d) a power-side body forming a second cavity disposed therethrough extending between a second fitting end to a power-side flanged end, wherein the power-side flanged end of the power-side body is connected to the second flange of the feed-through body;

e) a second seal disposed within the second annular groove, the second seal compressed between the second contactor plate and the power-side flanged end;

f) a load-side connector base having at one end a first plurality of conductive pin receptacles configured to receive the first plurality of contact pins, where the first plurality of conductive pin receptacles are connectable to a load side conductor at the other end;

g) a power-side connector base having at one end a second plurality of conductive pin receptacles configured to receive the second plurality of contact pins, where the second plurality of conductive pin receptacles are connectable to a power side conductor at the other end;

h) a first circumferential vapor seal between an outside surface of the load-side connector base and an inside surface of the load-side body;

i) a second circumferential vapor seal between an outside surface of the power-side connector base and an inside surface of the power-side body;

j) a first gasket between the load-side connector base and the first contactor plate, the first gasket comprising a plurality of holes configured to facilitate the first plurality of contact pins extending therethrough; and k) a second gasket between the power-side connector base and the second contactor plate, the second gasket comprising a plurality of holes configured to facilitate the second plurality of contact pins extending therethrough.

* * * * *